United States Patent
DeWind et al.

(10) Patent No.: US 12,281,926 B2
(45) Date of Patent: Apr. 22, 2025

(54) INDUSTRIAL METERING APPARATUS WITH A HINGED WINDOW

(71) Applicant: One Pass Innovators, LLC, Zeeland, MI (US)

(72) Inventors: Ryan DeWind, Zeeland, MI (US); Gregory Allen DeWind, Zeeland, MI (US)

(73) Assignee: One Pass Innovators, LLC, Zeeland, MI (US)

( * ) Notice: Subject to any disclaimer, the term of this patent is extended or adjusted under 35 U.S.C. 154(b) by 28 days.

(21) Appl. No.: 17/558,478

(22) Filed: Dec. 21, 2021

(65) Prior Publication Data

US 2022/0194714 A1 Jun. 23, 2022

Related U.S. Application Data

(60) Provisional application No. 63/128,617, filed on Dec. 21, 2020.

(51) Int. Cl.
*G01F 13/00* (2006.01)

(52) U.S. Cl.
CPC ........ *G01F 13/001* (2013.01); *B65G 2201/04* (2013.01)

(58) Field of Classification Search
CPC ....... G01F 23/02; G01F 13/001; B65G 33/00; B65G 33/08; B65G 33/14
USPC ... 222/154–159, 181.1–185.1, 189.02–189.6
See application file for complete search history.

(56) References Cited

U.S. PATENT DOCUMENTS

| 1,108,944 | A | * | 9/1914 | Tannenbaum | A01K 5/0258 198/550.6 |
| 1,540,165 | A | * | 6/1925 | Cytron | G01F 11/24 141/378 |
| 2,179,646 | A | * | 11/1939 | Spartalis | A47J 37/043 99/341 |

(Continued)

OTHER PUBLICATIONS

CN211733229U_MT; Machine translation into english of CN211733229U; obtained on Mar. 11, 2023 from: https://worldwide.espacenet.com/patent/search/family/072858773/publication/CN211733229U?q=211733229.*

(Continued)

*Primary Examiner* — Paul R Durand
*Assistant Examiner* — Randall A Gruby
(74) *Attorney, Agent, or Firm* — The Watson IP Group, PLC; Jovan N. Jovanovic

(57) ABSTRACT

An industrial metering apparatus includes a hopper, a metering mechanism, a discharge opening, a window, a hinge, and a locking mechanism. The hopper includes a housing to contain a bulk material. The metering mechanism is coupled to the hopper and meters a quantity of the bulk material leaving the hopper. The discharge opening is coupled to the metering mechanism and discharges the metered quantity of the bulk material. The window covers an opening through the side of the housing. The hinge couples the window to the housing such that the hinge allows the window to hingedly open to allow access to the opening through the side of the housing and hingedly close to substantially prevent the bulk material from escaping from the hopper. The locking mechanism locks the window in a closed position to substantially prevent the bulk material from escaping from the housing of the hopper.

11 Claims, 7 Drawing Sheets

(56) References Cited

U.S. PATENT DOCUMENTS

| | | | | |
|---|---|---|---|---|
| 3,665,840 A * | 5/1972 | Horany | A23B 4/052 | 99/443 R |
| 3,733,649 A * | 5/1973 | Nagy | E05D 11/0018 | 16/380 |
| 3,844,541 A * | 10/1974 | Artho | A24D 3/0225 | 366/181.5 |
| 3,858,759 A * | 1/1975 | Lubenow | D01G 23/06 | 222/55 |
| 4,130,052 A * | 12/1978 | Jacobson | A23B 4/052 | 219/405 |
| 4,218,169 A * | 8/1980 | Arends | B60P 1/40 | 414/526 |
| 4,344,580 A * | 8/1982 | Hoshall | B65G 65/46 | 366/322 |
| 4,368,722 A * | 1/1983 | Lynch | F24B 1/02 | 126/77 |
| 4,387,857 A * | 6/1983 | Young | B65G 41/002 | 241/101.8 |
| 4,512,248 A * | 4/1985 | Volakakis | A47J 37/043 | 99/421 V |
| 4,742,938 A * | 5/1988 | Niewold | B65G 21/12 | 222/536 |
| 4,875,820 A * | 10/1989 | Lepp | B65G 33/32 | 198/615 |
| 4,922,463 A * | 5/1990 | Del Zotto | B28C 9/0463 | 366/186 |
| 4,991,886 A * | 2/1991 | Nolte | E05C 9/1858 | 403/348 |
| 5,058,393 A * | 10/1991 | Callon | F25D 17/08 | 62/251 |
| 5,494,189 A * | 2/1996 | De Crane | B65D 90/623 | 222/105 |
| 6,607,100 B2 * | 8/2003 | Phelps | B67D 1/0858 | 222/399 |
| 6,971,324 B1 * | 12/2005 | Beck | A01C 15/003 | 111/9 |
| 7,464,803 B2 * | 12/2008 | Cashimere | B65G 47/086 | 198/396 |
| 7,500,814 B2 * | 3/2009 | Meyer | A01C 15/003 | 414/920 |
| 9,303,443 B2 * | 4/2016 | Lucas | E06B 3/481 | |
| 9,708,129 B1 * | 7/2017 | DeWind | B65G 41/003 | |
| 9,913,559 B2 * | 3/2018 | Polter | A47J 37/07 | |
| 10,029,258 B2 * | 7/2018 | Lang | B08B 15/026 | |
| 10,035,658 B2 * | 7/2018 | DeWind | B65G 41/003 | |
| 10,582,694 B2 * | 3/2020 | Dixon | A01K 5/0225 | |
| 10,876,332 B2 * | 12/2020 | Jones | E05C 7/04 | |
| 11,081,250 B2 * | 8/2021 | Harmon | A47B 55/00 | |
| 2007/0020071 A1 * | 1/2007 | Williams | B62B 1/268 | 414/455 |
| 2009/0114504 A1 * | 5/2009 | Bauman | B65G 33/00 | 198/316.1 |
| 2015/0361775 A1 * | 12/2015 | Pham | E21B 43/16 | 166/305.1 |
| 2016/0037919 A1 * | 2/2016 | Griffith | H05K 7/186 | 312/286 |
| 2019/0090453 A1 * | 3/2019 | Dixon | A01K 5/0225 | |
| 2020/0354154 A1 * | 11/2020 | Grieshop | B65G 33/14 | |
| 2022/0193948 A1 * | 6/2022 | DeWind | B28C 5/4237 | |
| 2022/0194720 A1 * | 6/2022 | DeWind | G01F 13/005 | |

OTHER PUBLICATIONS

Home Depot_Powertec 150 lbs. Vertical Quick-Release Toggle Clamp: published Feb. 29, 2020 by The Home Depot; obtained on Mar. 11, 2023 from: https://web.archive.org/web/20200229014550/ https://www.homedepot.com/p/POWERTEC-150-lbs-Vertical-Quick-Release-Toggle-Clamp-2-Pack-20320/306901063.*

* cited by examiner

INDUSTRIAL METERING APPARATUS WITH A HINGED WINDOW

CROSS-REFERENCE TO RELATED APPLICATION

This application claims priority from U.S. Provisional Patent Application Ser. No. 63/128,617 filed on Dec. 21, 2020, entitled "INDUSTRIAL METERING APPARATUS WITH A HINGED WINDOW", the entire disclosure of which is hereby incorporated by reference in its entirety.

BACKGROUND OF THE DISCLOSURE

1. Field of the Disclosure

The disclosure relates in general to industrial metering, and more particularly, to an industrial metering apparatus with a hinged window.

2. Background Art

Large quantities of bulk powdered material, such as cement and Bentonite, are used in many industrial applications. In many of these industrial applications, this bulk material must be accurately metered, particularly when this powdered material is combined with another material, such as water, to maintain a proportion between the two materials. Typically, such metering includes a volumetric screw feeder, a circle feeder, a disc feeder, weigh chain feeder, volumetric wheel feeder, etc. One such application of an industrial bulk material metering apparatus is for an industrial trencher.

SUMMARY OF THE DISCLOSURE

The disclosure is directed to an industrial metering apparatus that includes a hopper, a metering mechanism, a discharge opening, a window, a hinge, and a locking mechanism. The hopper includes a housing to contain a bulk material within an inside of the housing, the housing including an opening through a side of the housing. The metering mechanism is coupled to the hopper and meters a quantity of the bulk material leaving the hopper. The discharge opening is coupled to the metering mechanism and discharges the metered quantity of the bulk material. The window covers the opening through the side of the housing. The hinge couples the window to the housing and is disposed proximate to the opening such that the hinge allows the window to hingedly open to allow access to the opening through the side of the housing and hingedly close to substantially prevent the bulk material from escaping from the hopper through the opening. The locking mechanism locks the window in a closed position to substantially prevent the bulk material from escaping from the housing of the hopper through the opening.

In some configurations, the industrial metering apparatus further comprises a lid disposed on top of the housing of the hopper to substantially prevent the bulk material from escaping from the top of the housing.

In some configurations, the industrial metering apparatus further comprises a seal disposed between the window and the housing of the hopper to substantially prevent the bulk material from escaping from the hopper when the window is closed.

In some configurations, the locking mechanism is disposed on an opposite side of the window that the hinge is disposed, the locking mechanism including a handle that actuates a padded post to press against a frame of the window in the closed position.

In some configurations, the locking mechanism is a first locking mechanism, the industrial metering apparatus including a second locking mechanism.

In some configurations, the industrial metering apparatus further comprises a motor to power the metering mechanism.

In some configurations, the motor is one of a hydraulic motor and an electric motor.

In some configurations, the industrial metering apparatus further comprises a transmission coupled to the motor and the metering mechanism, the transmission transmitting power from the motor to the metering mechanism.

In some configurations, the industrial metering apparatus further comprises a coupler to couple the industrial metering apparatus to an excavator.

In some configurations, the excavator is a trencher.

In some configurations, a system includes the industrial metering apparatus, the system further including an excavator.

In some configurations, the window is a first window disposed on a first side of the housing, the industrial metering apparatus further comprises a second window disposed on a second side of the housing.

In some configurations, the window includes a panel surrounded by a frame.

In some configurations, the panel is one of glass and plexiglass.

In some configurations, the metering mechanism is at least one of a volumetric screw feeder, a circle feeder, a disc feeder, weigh chain feeder, and volumetric wheel feeder.

In some configurations, the hinge is substantially a same length as a height of the window.

In some configurations, the industrial metering apparatus further comprises a support frame to allow the industrial metering apparatus to remain in a vertical orientation when not in use.

In some configurations, the window extends from proximate to a top of the hopper to a bottom of the hopper.

In some configurations, the hinge is disposed on a left side of the window.

BRIEF DESCRIPTION OF THE DRAWINGS

The disclosure will now be described with reference to the drawings wherein.

DETAILED DESCRIPTION OF THE DISCLOSURE

Figure 1:
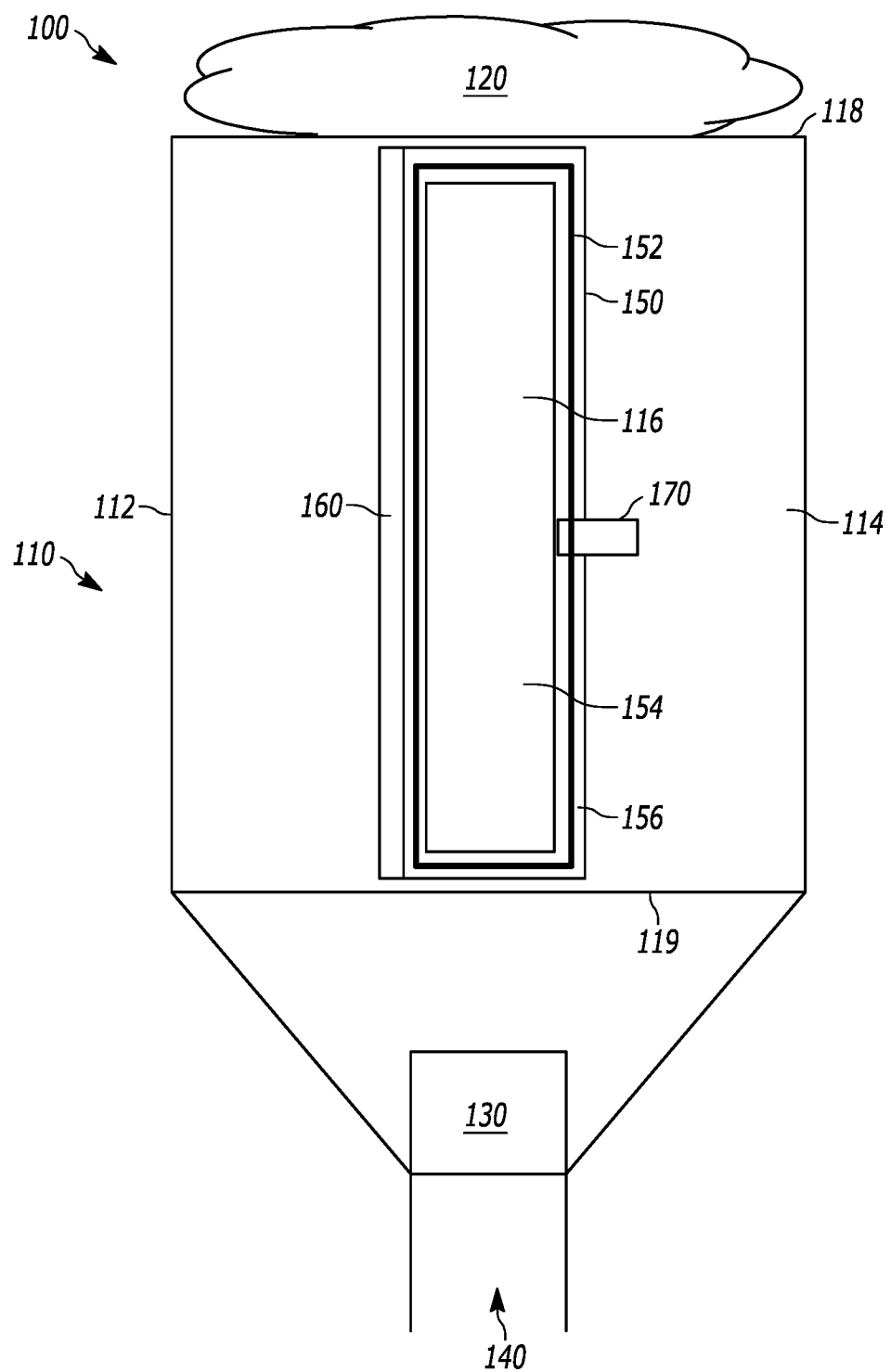
FIG. 1 illustrates a front view of an example industrial metering apparatus, in accordance with at least one embodiment disclosed herein.
Figure 2:
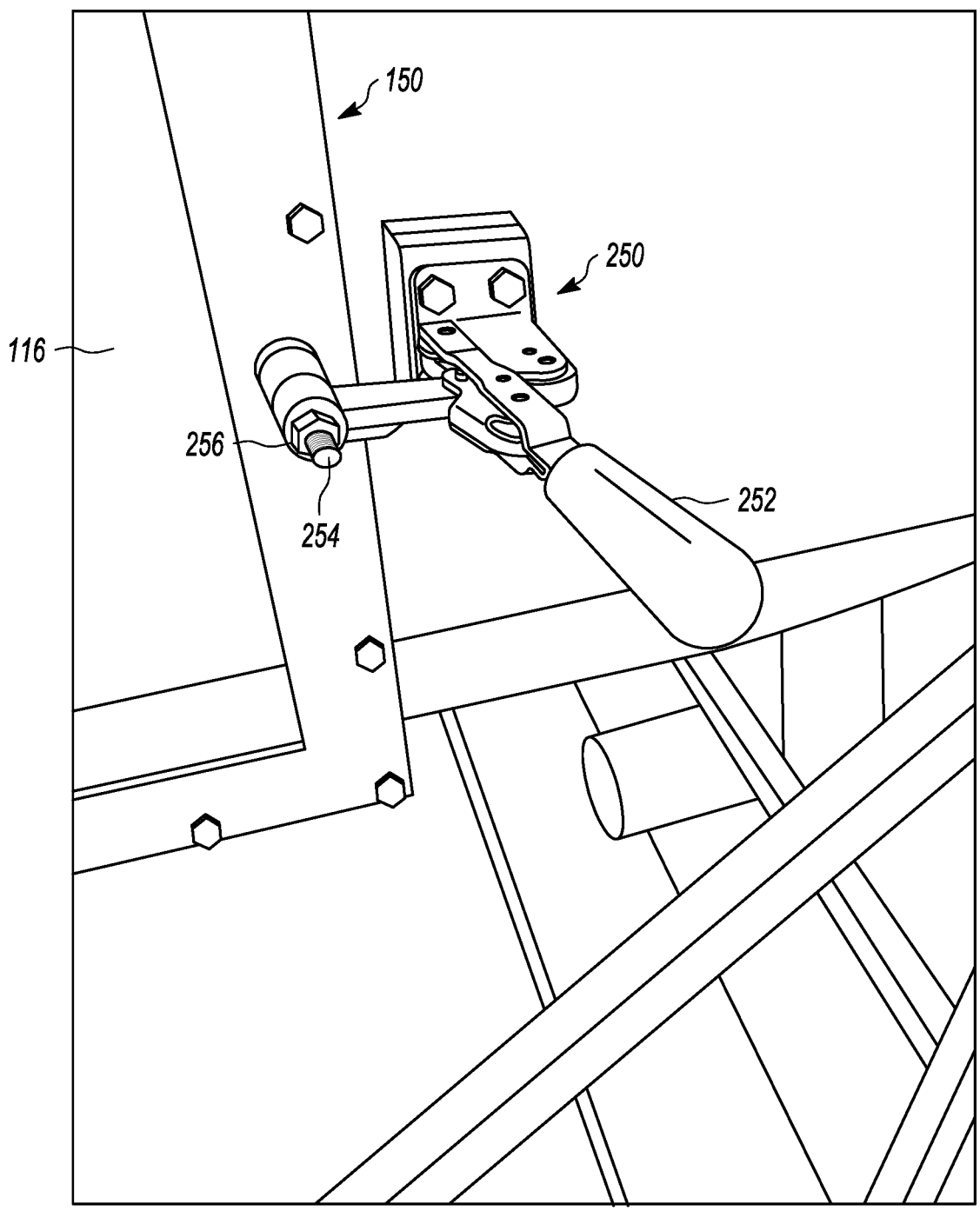
FIG. 2 illustrates an example locking mechanism for use with the industrial metering apparatus shown in FIG. 1, in accordance with at least one embodiment disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

It has become appreciated that typical metering apparatus that are used for metering bulk powdered material, such as cement or bentonite, have a deficiency. For such bulk material, it is time consuming to fill this metering apparatus unless the bulk material is actually depleted. However, there is not typically a convenient way to check on how much of a volume of bulk material remains in a hopper of the metering apparatus. Typically, a user requires access to an opening, typically the top of the hopper that used to load the hopper with the bulk powdered material. In many instances, this is inconvenient to do since this opening is typically covered with a heavy metal cover which requires removal. The embodiment(s) disclosed herein at least mitigate such a deficiency.

Referring now to the drawings and in particular to FIG. 1, an apparatus is disclosed, such as an example industrial metering apparatus 100, is shown. In at least one embodiment, the industrial metering apparatus 100 can be constructed from metal, such as steel, aluminum, cast metal, or any other material that is strong enough to hold the bulk material 120. The industrial metering apparatus 100 includes a hopper 110, this hopper 110 including a housing 112 to contain a bulk material 120, such as cement, dirt, grain, or any other type of bulk material, within an inside 614 (FIG. 6) of the housing 112. The housing 112 includes an opening 116, such as through a front side 114 of the housing 112, as shown.

Figure 5:
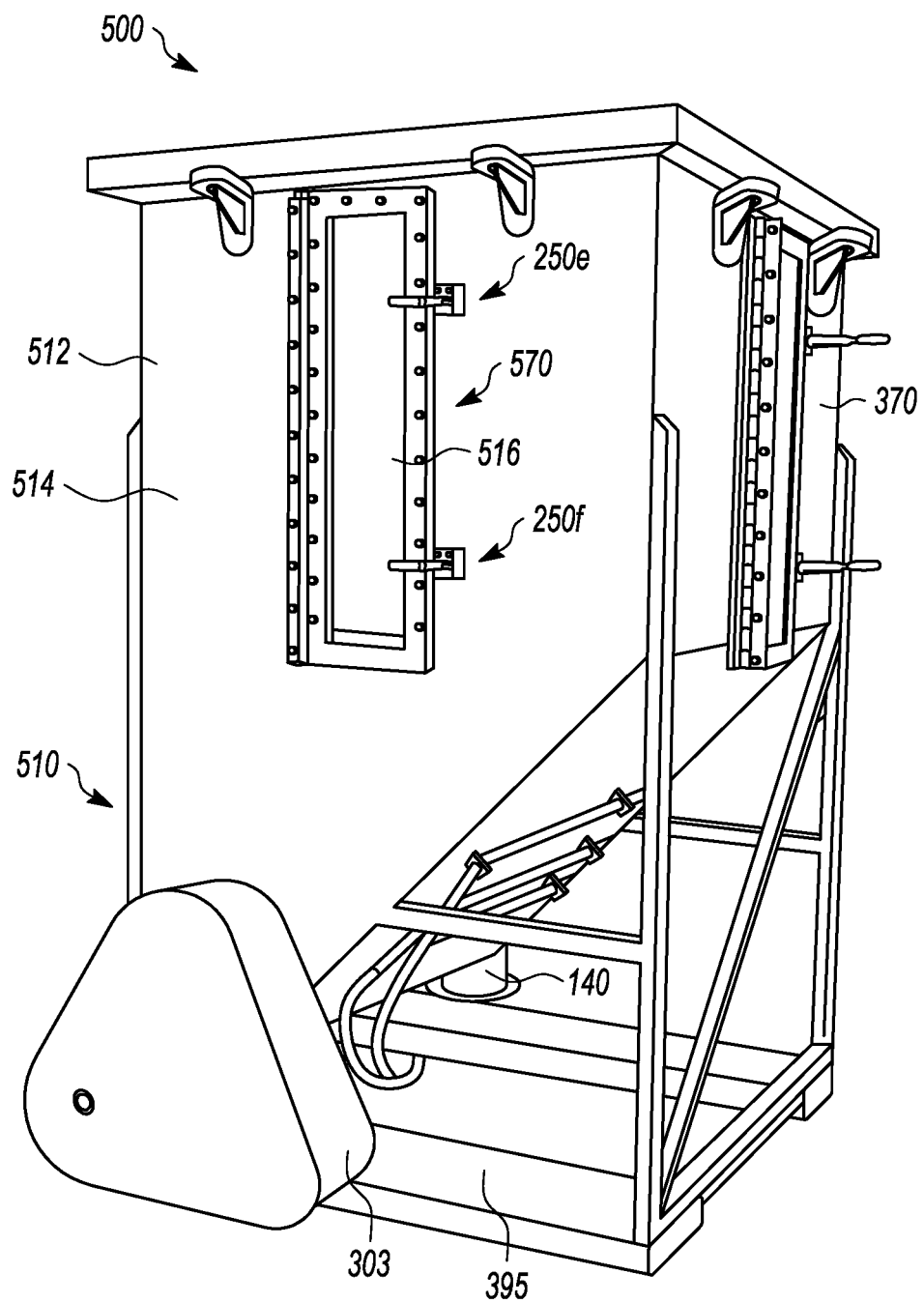
FIG. 5 illustrates yet another example industrial metering apparatus, in accordance with at least one embodiment disclosed herein.
Figure 6:
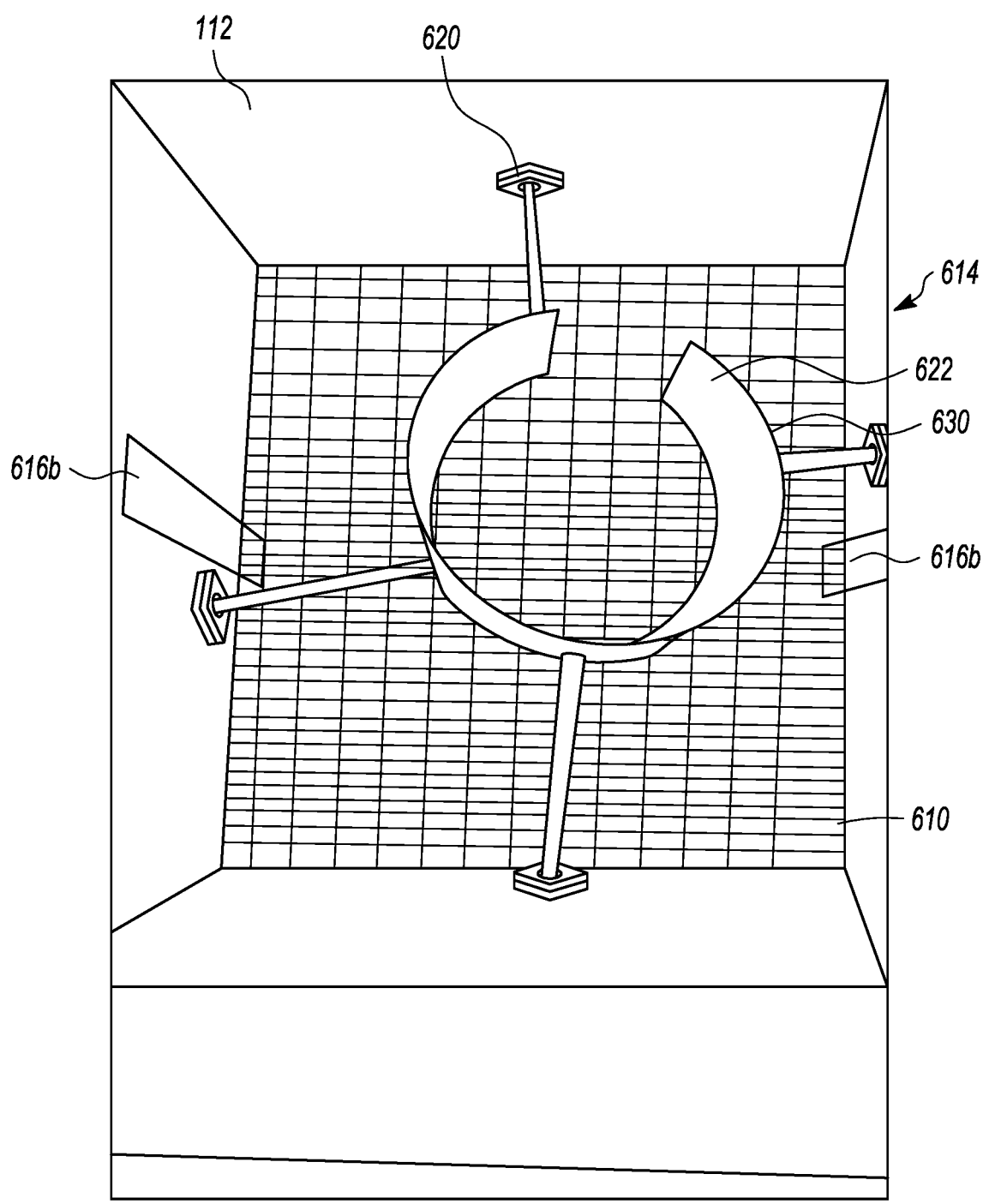
FIG. 6 illustrates a top-down view of any of the industrial metering apparatus shown in FIGS. 1-5, as looking down into a housing of a hopper.

In at least one other embodiment, another example industrial metering apparatus 400 includes another opening 416 (FIG. 4) on another side of its housing 412, such as a right side 414, in the orientation as shown, and/or an industrial metering apparatus 500 includes yet another opening 516 (FIG. 5) on a left side 514 of its housing 512, in the orientation as shown. In at least one other embodiment, openings 616a and 616b can be disposed on opposite walls of a hopper 610 (FIG. 6), with a windows 150 covering each of these openings 616a/616b. Likewise, as shown in FIG. 1, a window 370 (FIG. 3) is used to cover the opening 316, a window 470 (FIG. 4) is used to cover the opening 416, and a window 570 (FIG. 5) is used to cover the opening 516. In at least one embodiment, the hopper 110 can be approximately (+−10%) square when viewed from the top (FIG. 6). In at least one other embodiment, the hopper 110 can be approximately (+−10%) rectangular (not shown), approximately (+−10%) circular (not shown), approximately (+−10%), pentagonal (not shown), approximately (+−10%) octagonal (not shown), or any other shape that allows the hopper 110 to hold a volume of the bulk material 120.

The industrial metering apparatus 100 further includes a metering mechanism 130, coupled to the hopper 100, to meter a quantity of the bulk material 120 leaving the hopper 110. In at least one embodiment, the metering mechanism 130 can be at least one of a volumetric screw feeder type metering mechanism, a circle feeder type metering mechanism, a disc feeder type metering mechanism, weigh chain feeder type metering mechanism, a volumetric wheel feeder type metering mechanism, and/or any other type of metering mechanism that provides metering of the bulk material 120 from the hopper 110. In at least one embodiment, the metering mechanism 130 can be disposed below the hopper 110, as shown, such that the bulk material 120 falls into the metering mechanism 130 via gravity. In at least one other embodiment, the metering mechanism 130 can be disposed on another side of the hopper 110, e.g., such as on a back side of the hopper 110 (not shown), such that the bulk material 120 is forced into the metering mechanism 130 via pneumatics or another other method of pushing the bulk material 120 into the metering mechanism 130.

The industrial metering apparatus 100 further includes a discharge opening 140, coupled to the metering mechanism 130, to discharge the metered quantity of the bulk material 120. In at least one embodiment, the discharge opening 140 is disposed at the bottom of the industrial metering apparatus 100, as shown. In at least one other embodiment, the discharge opening 140 can be disposed at another location of the industrial metering apparatus 100, such as on the front side 114, a back side, the left side 314 (FIG. 3), a right side of a housing 514 (FIG. 5), or even the top of the industrial metering apparatus 100, as needed for a particular application of the industrial metering apparatus 100. In at least one embodiment, the discharge opening 140 can include some type of coupler, e.g., threads (not shown), that allows a pipe (not shown), e.g., a flexible pipe 740 (FIG. 7), to couple to the discharge opening 140.

The industrial metering apparatus 100 further includes a window 150 to cover an opening, such as at least one of the openings 116, 416, 516, through the front side 114, the left side 314, and/or the right side 414 of the housing 112/314/514, respectively. In at least one embodiment, the industrial metering apparatus 100 further includes a seal 152 disposed between the window 150 and the housing 112 of the hopper 110 to substantially prevent (e.g., <1% of the bulk material 120 may escape from the housing 112) the bulk material 120 from escaping from the hopper 110 when the window 150 is closed. In at least one embodiment, the seal 152 is comprised of at least one of industrial rubber, Polytetrafluoroethylene (PTFE), Fluorosilicone (FVMQ), Polyurethane (AU, EU), or any other seal material that prevents the bulk material 120 from escaping from the hopper 110 when the window 150 is closed. In at least one embodiment, the window 150 includes a panel 154, such as a glass panel, a plexiglass panel, or any other transparent material panel that allows visual inspection of an interior of the hopper 110 when the window 150 is closed. The panel 154 is at least partially surrounded by a frame 156.

In at least one embodiment, the frame 156 can be a same material or different than that used to construct the rest of the industrial metering apparatus 100. In at least one embodiment, the window 150 extends from proximate a top 118 of the hopper 110 to a bottom 119 of the hopper 110, as shown. In at least one other embodiment, the window 150 can be shorter in height such that it can be positioned where visual inspection of an interior of the hopper 110 is most needed, without departing from the scope of the embodiment(s).

The industrial metering apparatus 100 further includes a hinge 160 to couple the window 150 to the housing 112. The hinge 160 is disposed on a left side of the window 150, as shown, proximate to the opening 116 such that the hinge 160 allows the window 150 to hingedly open (e.g., swing to the left) to allow access to the opening 116 through a side, such as the front side 114, of the housing 112 and hingedly close to substantially prevent the bulk material 120 from escaping from the hopper 110 through the opening 116, although some small amount of powder may escape depending upon how fine the bulk material 120 is. This opening of the window 150 allows a user to not only see inside the hopper 110, but also access to an inside of the window 150 to clean an inside of the panel 154 when it becomes coated with a layer of the bulk material 120 during use. In at least one other embodiment, the hinge 160 can be disposed on any side of the window 150, such as on a top side, right side, or left side of the window 150. In at least one embodiment, the hinge 160 is substantially (+−5%) a same length as a height of the window 150, as shown. This length allows a secure coupling between the window 150 and the housing 112 along the full height of the window 150.

In at least one other embodiment, the hinge 160 can be shorter than the full height of the window 150. In at least one other embodiment, the industrial metering apparatus 100 can include two or more hinges (not shown), without departing from the scope of the embodiment(s). The window 150 can be coupled to the housing 112 via one or more fasteners, such as screws, rivets, bolts, welding, or any other method that prevents the window 150 from separating from the housing 112 during use.

The industrial metering apparatus 100 further includes a locking mechanism 170. The locking mechanism 170 locks the window 150 in a closed position to substantially prevent the bulk material 120 from escaping from the housing 112 of the hopper 110 through the opening 116. In at least one embodiment, the locking mechanism 170 is disposed on an opposite side of the window 150 that the hinge 160 is disposed, coupled to the housing 112 next to the frame 152, as shown. In at least one embodiment as shown in FIGS. 2-5, the locking mechanism 150 is a handle/post locking mechanism 250a/250b/250c/250d/250e/250f that each include a handle 252 that actuates a padded post 254 (e.g., rubber pad) to press against the frame 156 of the window 150 in the closed position. The padded post 254 prevents damage to the frame 156 when the padded post 254 presses against the frame 156. In at least one embodiment, the locking mechanism 250 further includes an adjuster 256, e.g., a nut that screws onto threads of the padded post 254, to adjust an amount of pressure exerted by the padded post 254 against the frame 256.

During use to prevent the bulk material 120 from escaping the housing 112 of the hopper 110, the handle 252 is pushed toward from the frame 156 which results in the padded post 254 being pushed against the frame 156, pushing the frame 156 against the seal 152. During use to open the window 150, the handle 252 is pushed away from the frame 156 which results in the padded post 254 being pulled away from the frame 156, releasing the frame 156 from pushing against the seal 152. In at least one other embodiment, other locking mechanisms can be used without departing from the scope of the embodiment(s), such as a swivel action lock (not shown), a sliding window lock (not shown), a hinged wedge lock (not shown), a window pin lock (not shown), a folding latch (not shown), a handle lock (not shown), or any other type of window locking mechanism, or any other locking mechanism, that secures the window 150 against the housing 112.

Figure 3:
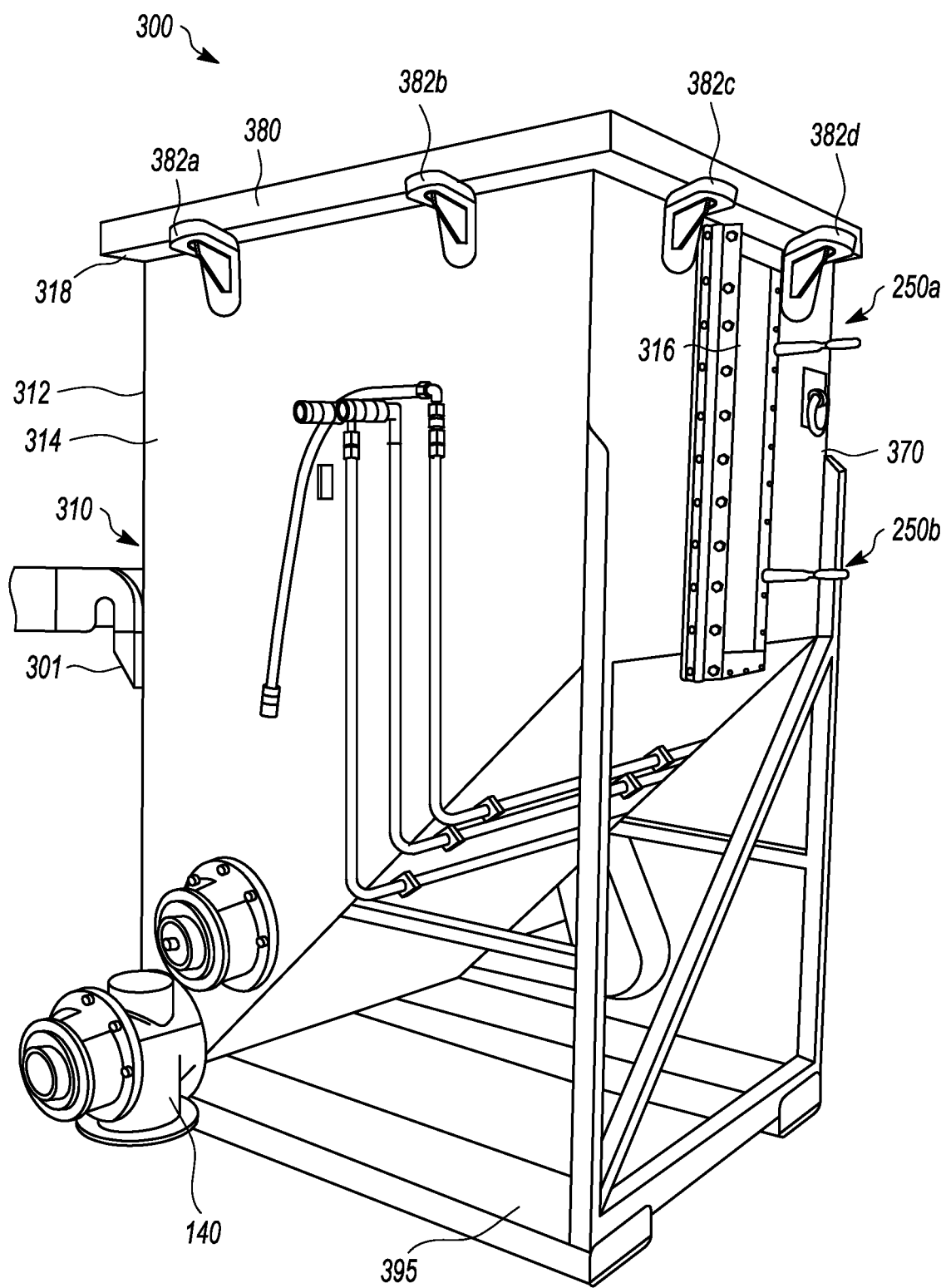
FIG. 3 illustrates an isometric view of another example industrial metering apparatus, in accordance with at least one embodiment disclosed herein.
Figure 4:
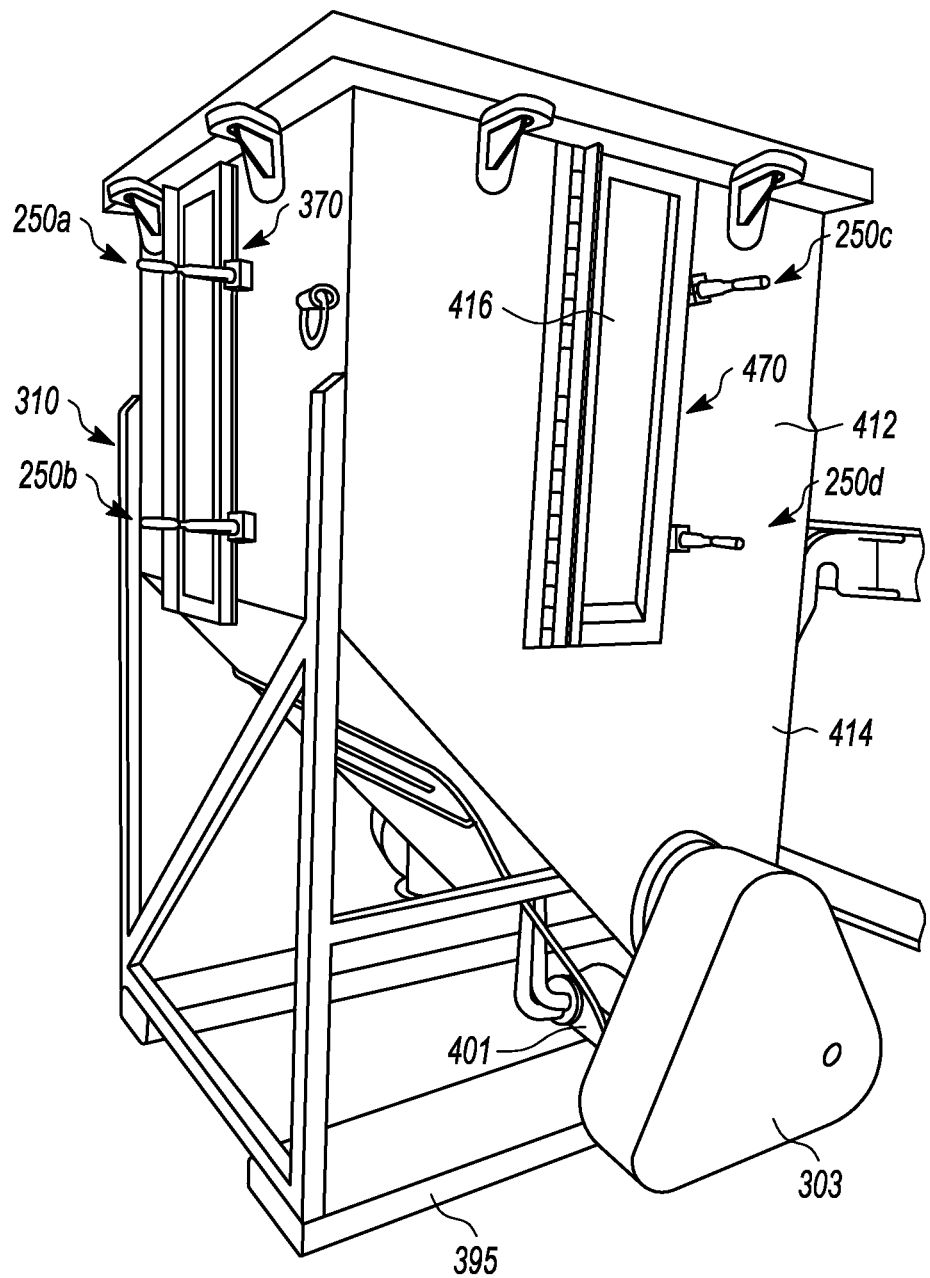
FIG. 4 illustrates another isometric view of the industrial metering apparatus shown in FIG. 3, in accordance with at least one embodiment disclosed herein.

In at least one embodiment, the industrial metering apparatus 100 can include more than one locking mechanism. For example, another example industrial metering apparatus 300 can include a first locking mechanism 250a disposed proximate to a top of the window 150 and a second locking mechanism 250b disposed proximate to a bottom of the window 150, as shown in FIGS. 3-5. In at least one embodiment, the industrial metering apparatus 300 can include a lid 380 disposed on top 318 of a housing 312 of a hopper 310 to substantially prevent (e.g., <1% of the bulk material 120 may escape from the housing 312) the bulk material 120 therein from escaping from the top 318 of the housing 312, as shown.

In at least one embodiment, the industrial metering apparatus 300 can include locking tabs, such as pairs of locking tabs 382a/382b/382c/382d that are disposed along a perimeter of the lid 380 and corresponding along a perimeter of the top 318 of the housing 312. These pairs of locking tabs 382a/382b/382c/382d can include holes therethrough (not shown) that allow a lock to be disposed through these holes to prevent the lid 318 from becoming detached during use of the industrial metering apparatus 300.

In at least one embodiment, the industrial metering apparatus 300 further includes a motor 401 to power the metering mechanism 130. In at least one embodiment, the motor 401 is a hydraulic motor, as shown with hydraulic lines running to and from the motor disposed under the hopper 310. In at least one other embodiment, the motor 401 is an electric motor. In the particular configuration shown, the motor 401 is disposed below the hopper 310. In at least one embodiment, mechanically coupled to both the metering mechanism 130 and the motor 401 is a transmission 303. The transmission 303 transmits power from the motor 401 to the metering mechanism 130, such as via gears and/or a chain therein.

As show in FIGS. 3 and 4, the transmission 303 can be disposed on a right side of the industrial metering apparatus 300, or can be disposed on a left side of the industrial metering apparatus 300, dependent upon particular job site needs. In at least one embodiment, the industrial metering apparatus 300 further includes a coupler, e.g., a hook and/or eyes, to couple the industrial metering apparatus 300 to a trencher 710 (FIG. 7) and/or a support frame 395 made up of various members to allow the industrial metering apparatus 300 to remain in a vertical orientation when not in use, as shown. The industrial metering apparatus 300 and the trencher 300 together form a system 700 (FIG. 7).

In at least one embodiment as shown in FIG. 6, the industrial metering apparatus 100/300/400/500 can further include a grate 610 disposed proximate to the bottom 119 of the hopper 110/310/510. In at last one embodiment, the grate 610 is substantially (+−5%) a same dimension as the bottom 119 of the housing 112/312/512. In at least one other embodiment, the grate 119 can be a different dimension than the bottom 119 of the housing 112/312/512, such as smaller than the bottom 119 of the housing 112/312/512. As can be seen, an opening 616a can extend to this grate 610 and an opening 616b can extend past this grate 610. Although not show, windows are disposed over these openings 616a/616b.

In at least one embodiment, a bag-stop 620 is disposed within the housing 112/312/512. This bag-stop 620 punctures a bulk material bag (not shown) storing the bulk material 120 that is placed into the housing 112/312/512. This puncture allows the bulk material 120 to fall into a metering mechanism, such as a screw or an auger 630. In at least one embodiment, the bag-stop 620 includes a crescent shaped member 622 coupled to the housing 112/312/512 via bracing members, such as four bracing members 624a/624b/624c/624d disposed around a perimeter of the crescent shaped member 622, as shown, each coupled to a different side of the housing 112/312/512.

Figure 7:
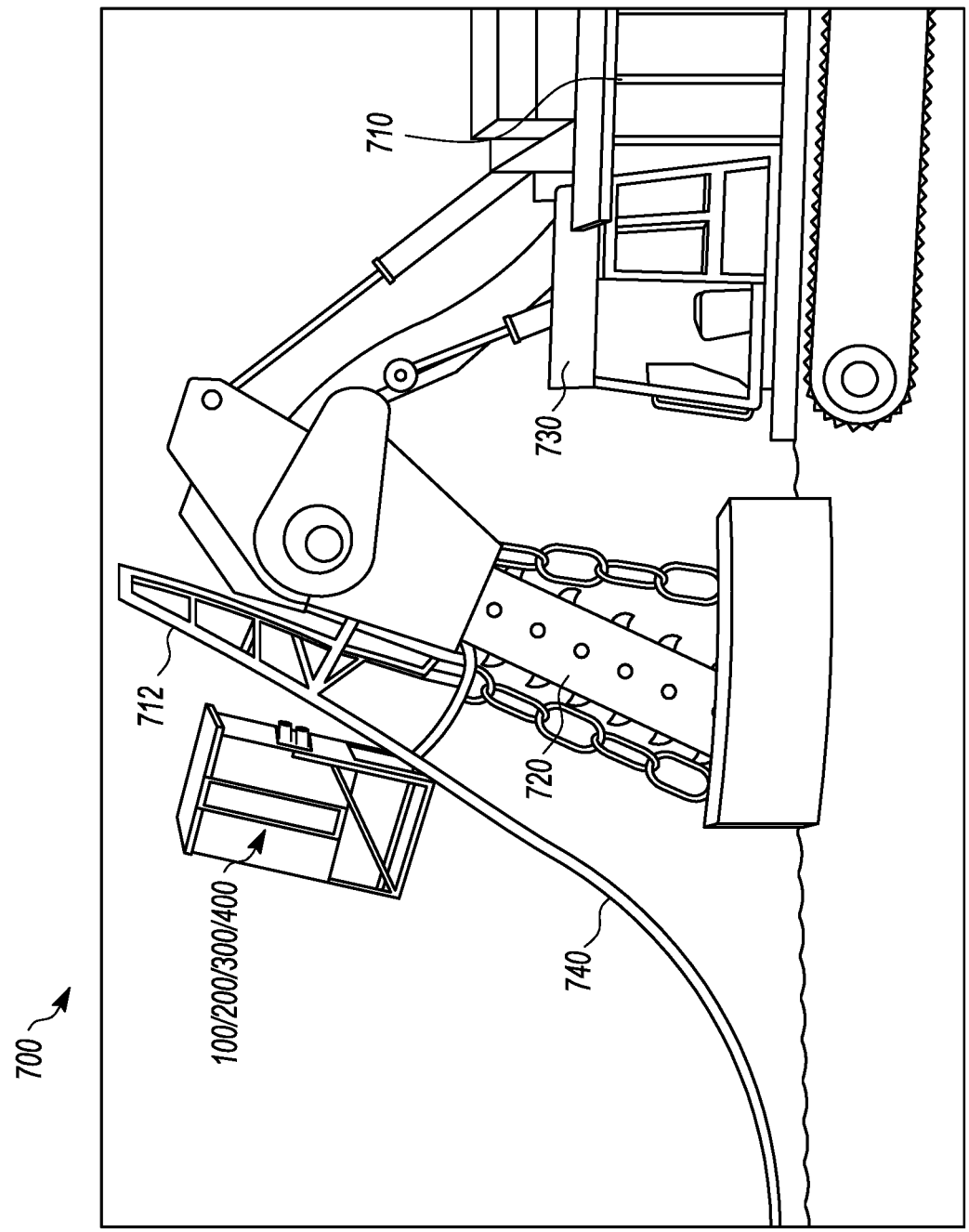
FIG. 7 illustrates an example system including any of the industrial metering apparatus shown in FIGS. 1-6 and an excavator, in accordance with at least one embodiment disclosed herein.

FIG. 7 illustrates a system 700 that includes the industrial metering apparatus 100/300/400/500 coupled to a trencher 710, such as proximate to a front 712 (e.g., on side of the trencher 710 including an operator's controls 730) of the trencher 710, as shown, the front 712 also being proximate to the blades 720 of the trencher 710. The trencher 710 is shown performing an example excavation, such as installing a groundwater barrier or a soil Bentonite cutoff wall. This type of barrier prevents groundwater from being able to flow past a location in which the barrier has been installed.

The trencher 710 can be of the type developed by DeWind Corporation. The trencher 710 can be of the type that uses one-pass trenching technology, such as model MT2000 or MT3500. These trenchers install various types of systems deeper, faster, safer, and at less cost than most conventional alternatives. The MT 3500 (e.g., with up to 3,500 horse power) can reach depths of up to 125' feet below grade for "Mix In Place" walls, such as soil Bentonite Walls, and soil cement Bentonite wall installations. The trencher 710 can be a one-pass trencher that can mixed-in-place soil Bentonite and soil, cement Bentonite into a completely homogenized wall from top to bottom and from start to finish. These one-pass trenchers utilize a continuous vertical mixing that eliminates possibility for window or voids in the wall. One-pass barrier walls are evenly and consistently mixed throughout. These one-pass trenchers can mix a heavy high slump mix in place. This ability to mix a super heavy slump makes one-pass ideal for dam and levee repair. The industrial metering apparatus 100 can be used as a metered Bentonite delivery system.

These one-pass trenchers can use underground water injection nozzles, pre-mixed slurry injection ports, speed controls for both the mixing chain and track speeds, GPS mapping and laser guides to control depth. Engineers who use these one-pass trenchers prefer them to conventional excavator installation methods because of the completely homogenized soils from top to bottom, secure key into confining layer, no possibility for voids in the wall, precise laser installations, no messing mixing ponds, ability to work in tight sites, no open excavation and fast installation rates with a precise mapping of the alignment for future use. These one-pass trenchers can build trenches that are 125'+ deep, are 12"-48" wide, and can build 200-500 linear feet per day.

In at least one embodiment, the bulk material 120 can be comprised of Bentonite which is an absorbent aluminium phyllosilicate clay consisting mostly of montmorillonite. It was named by Wilbur C. Knight in 1898 after the Cretaceous Benton Shale near Rock River, Wyo. The different types of Bentonite are each named after the respective dominant element, such as potassium (K), sodium (Na), calcium (Ca), and aluminium (Al). Bentonite usually forms from weathering of volcanic ash, most often in the presence of water. However, the term Bentonite, as well as a similar clay called tonstein, has been used to describe clay beds of uncertain origin. For industrial purposes, two main classes of Bentonite exist: sodium and calcium Bentonite. In stratigraphy and tephrochronology, completely devitrified (weathered volcanic glass) ash-fall beds are commonly referred to as K-Bentonites when the dominant clay species is illite. In addition to montmorillonite and illite, another common clay species that is sometimes dominant is kaolinite. Kaolinite-dominated clays are commonly referred to as tonsteins and are typically associated with coal.

The property of swelling on contact with water makes sodium Bentonite useful as a sealant, since it provides a self-sealing, low-permeability barrier. It is used to line the base of landfills to prevent migration of leachate, for quarantining metal pollutants of groundwater, and for the sealing of subsurface disposal systems for spent nuclear fuel.[10] Similar uses include making slurry walls, waterproofing of below-grade walls, and forming other impermeable barriers, e.g., to seal off the annulus of a water well, to plug old wells.

Bentonite can also be "sandwiched" between synthetic materials to create geosynthetic clay liners (GCLs) for the aforementioned purposes. This technique allows for more convenient transport and installation, and it greatly reduces the volume of bentonite required. It is also used to form a barrier around newly planted trees to constrain root growth so as to prevent damage to nearby pipes, footpaths and other infrastructure. Farmers use bentonite to seal retention ponds and line canals.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An industrial metering apparatus, comprising:
a hopper including a housing to contain a bulk material within an inside of the housing, the housing having an upper section including four sides defining a rectangular cross-sectional configuration, and a lower section including at least one wall tapering to an opposite wall so as to reduce the cross-sectional configuration to a bottom, the upper section defining a fill cavity, and a grate extending across the housing to divide the upper section from the lower section, the upper and lower sections being integrally formed together across the four sides, with at least two of the four sides in the upper section having a window opening extending therethrough, each window opening extending from an upper end of the upper section to the grate;
a metering mechanism, coupled to the hopper, to meter a volumetric quantity of the bulk material leaving the hopper, the metering mechanism positioned at the bottom of the lower section;
a discharge opening, coupled to an outlet of the metering mechanism, structurally configured to allow a discharge of the metered quantity of the bulk material;
a window positioned to cover each window opening, each window comprising a transparent panel and a window frame extending therearound, each window frame corresponding to one of the window openings so as to cover each window opening through the side of the housing;
a hinge associated with each window to couple the window frame to the housing, the hinge extending continuously from a top of a first side of the window frame to a bottom of a first side of the window frame, such that the hinge allows the window to hingedly open to allow access to the opening through the side of the housing and hingedly close to prevent the bulk material from escaping from the hopper through the opening; and a locking assembly associated with each window, the locking assembly comprising a pair of spaced apart handle/post locking mechanisms, each locking mechanism including a handle that actuates a padded post to press against the frame of the window in a closed position, with a seal extending around the window frame to seal the opening in substantially fluid tight engagement when the window is positioned in the closed position;

wherein a lid is disposed on a top opening of the housing of the hopper, the lid structurally configured to seal the top opening in substantially fluid tight engagement; and wherein the industrial metering apparatus further comprises a coupler to couple the industrial metering apparatus to an excavator.

2. The industrial metering apparatus according to claim 1, further comprising a motor to power the metering mechanism.

3. The industrial metering apparatus according to claim 2, wherein the motor is one of a hydraulic motor and an electric motor.

4. The industrial metering apparatus according to claim 2, further comprising a transmission, coupled to the motor and the metering mechanism, to transmit power from the motor to the metering mechanism.

5. The industrial metering apparatus according to claim 1, wherein the excavator is a trencher.

6. A system including the industrial metering apparatus according to claim 1, wherein the system further includes an excavator.

7. The industrial metering apparatus according to claim 1, wherein at least one of the transparent panels is one of glass and plexiglass.

8. The industrial metering apparatus according to claim 1, wherein the metering mechanism is at least one of a volumetric screw feeder, a circle feeder, a disc feeder, weigh chain feeder, and volumetric wheel feeder.

9. The industrial metering apparatus according to claim 1, further comprising a support frame to allow the industrial metering apparatus to remain in a vertical orientation when not in use.

10. The industrial metering apparatus according to claim 1, wherein the hinge is disposed on a left side of the window.

11. The industrial metering apparatus according to claim 1, wherein each window opening is centrally mounted on each one of the respective walls.

* * * * *